Oct. 21, 1969         J. S. BALLANTINE ET AL         3,473,436
PROGRAMMED CONTROL DEVICE INCLUDING SPOOL BOX
AND RELATED MECHANISM
Filed Jan. 18, 1968                    6 Sheets-Sheet 1
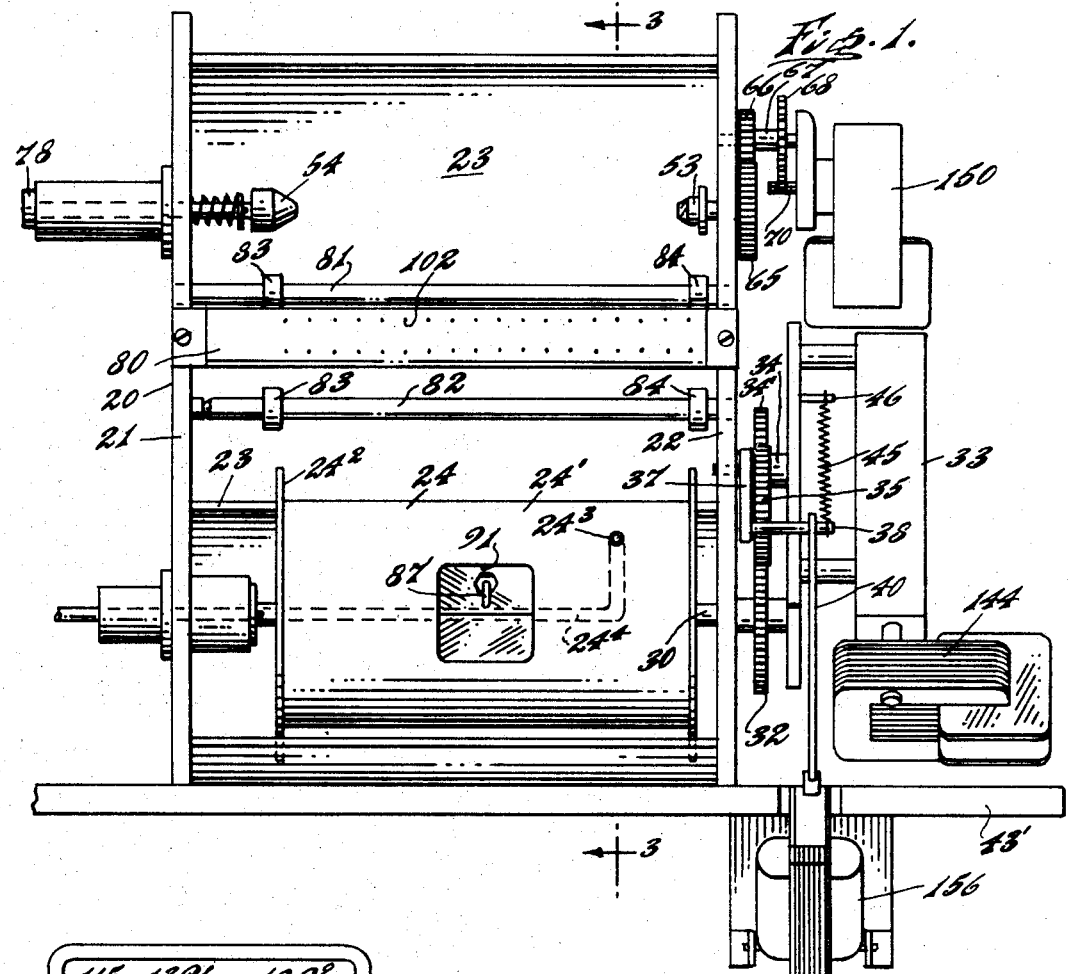
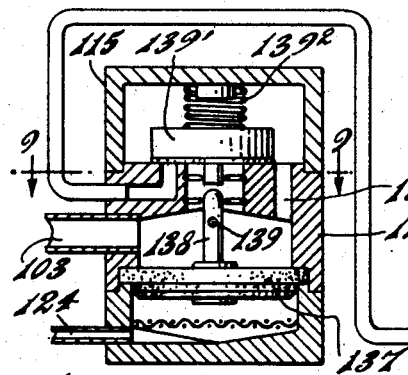
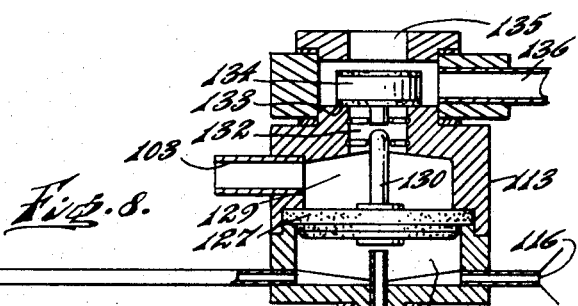
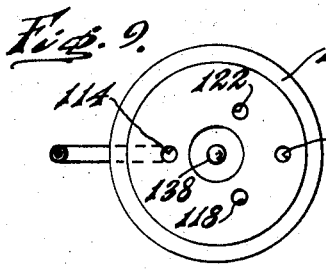
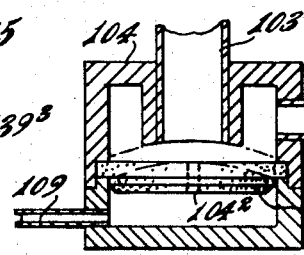
INVENTORS.
James S. Ballantine
Patrick Mastronardi
BY
ATTORNEYS

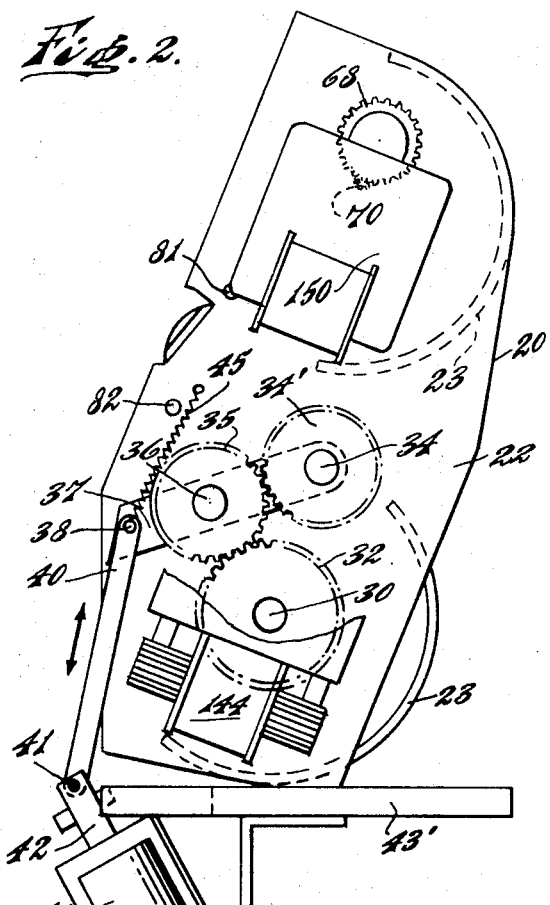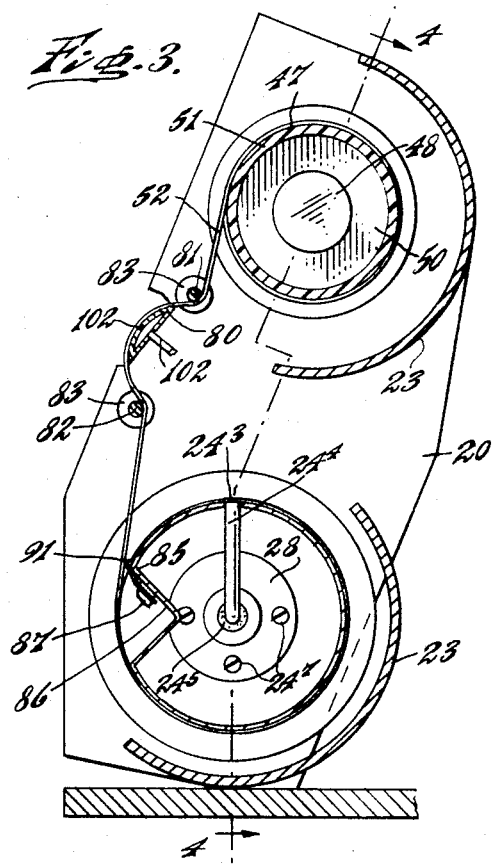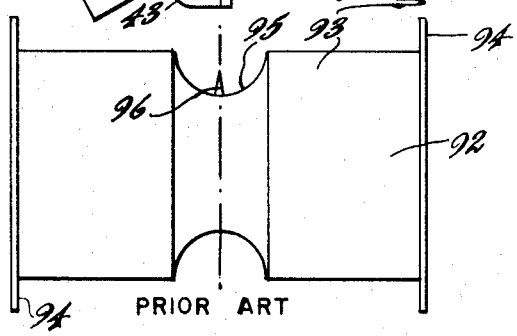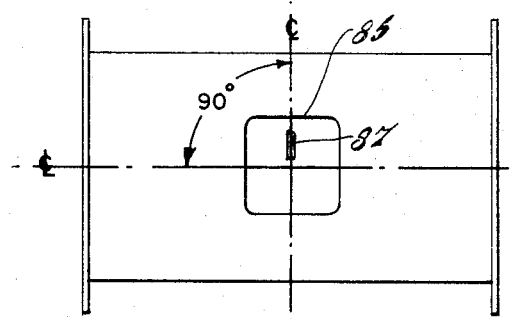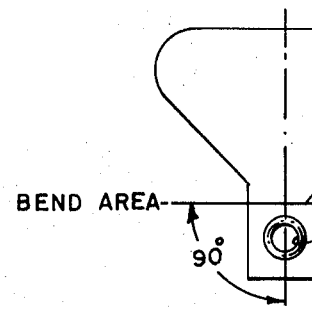

INVENTORS
James S. Ballantine
Patrick Mastronardi
BY
ATTORNEYS

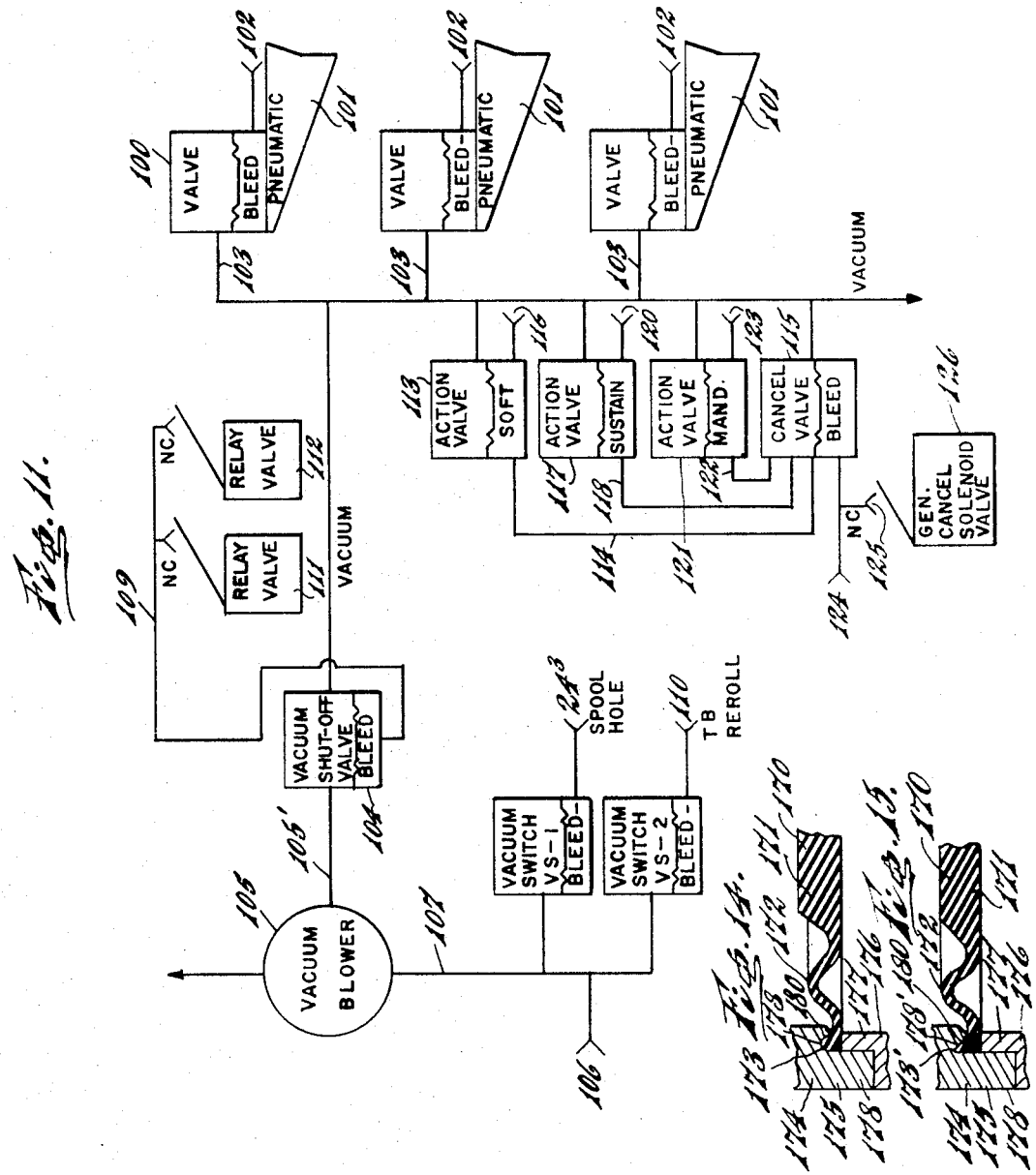

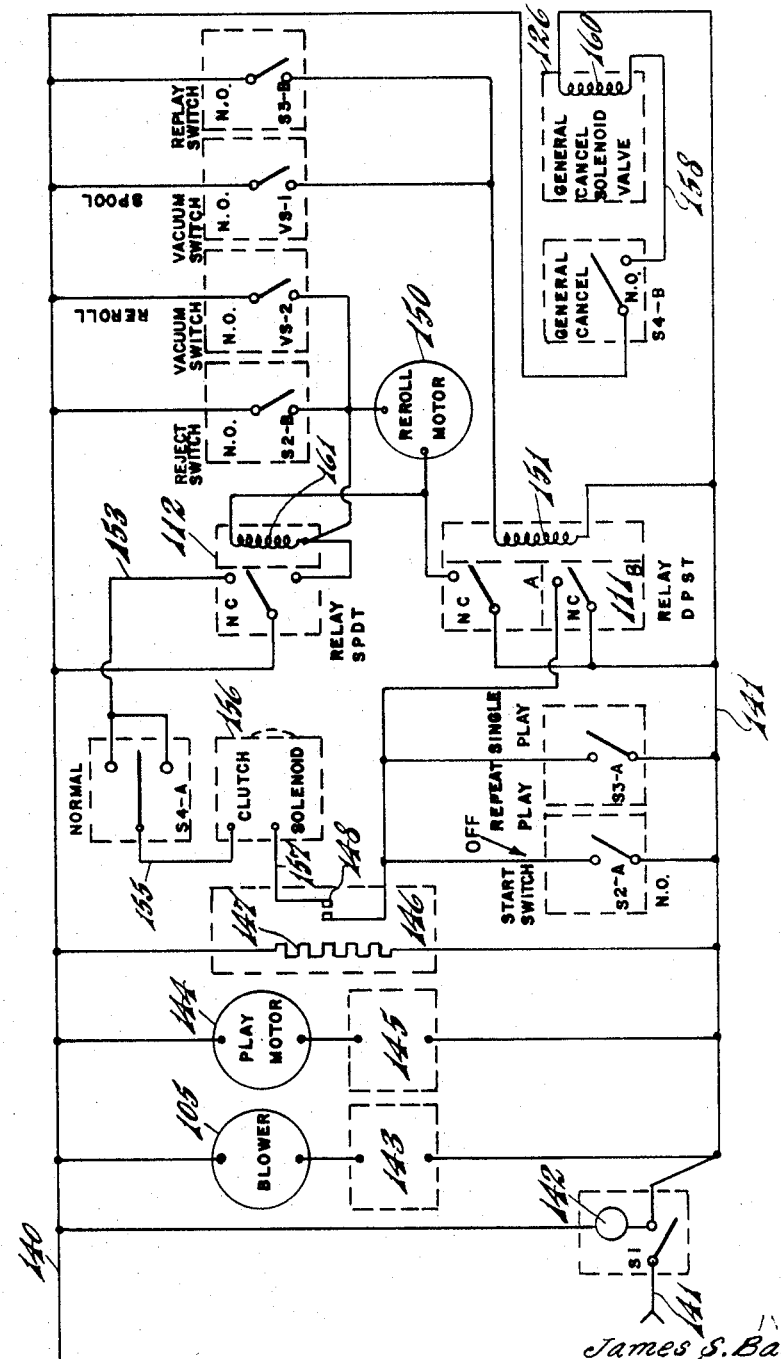

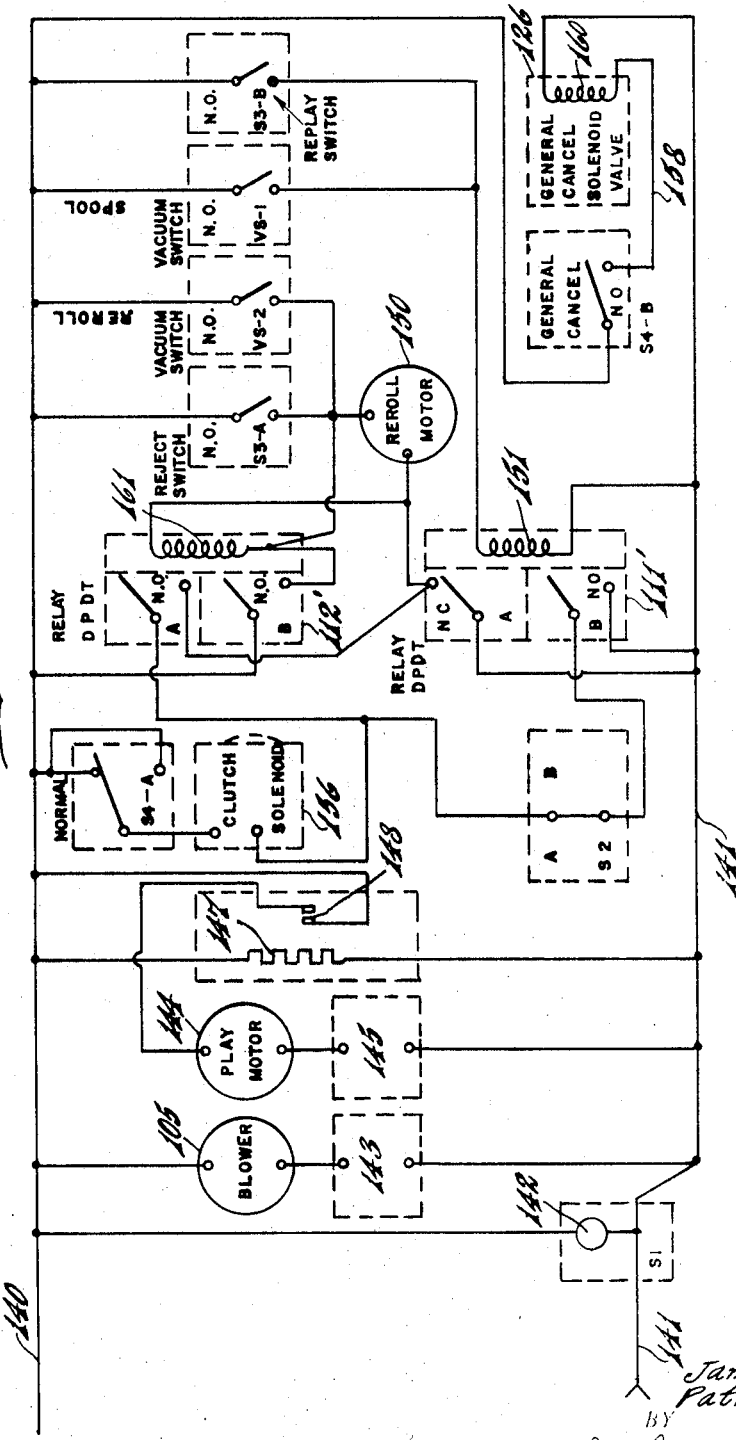

United States Patent Office 3,473,436
Patented Oct. 21, 1969

3,473,436
PROGRAMMED CONTROL DEVICE INCLUDING SPOOL BOX AND RELATED MECHANISM
James S. Ballantine, 121 N. Shore Road, Absecon, N.J. 08201, and Patrick Mastronardi, 3103 Cedar Bridge Road, Northfield, N.J. 08225
Filed Jan. 18, 1968, Ser. No. 698,866
Int. Cl. F15b 21/02; F01b 29/02; G10f 5/06
U.S. Cl. 91—36   18 Claims

ABSTRACT OF THE DISCLOSURE

The invention relates to improvements in a programmed control device of the type for example of a player piano. The improvements include the construction of the spool box itself, means for assuring that the roll on which the control strip is wound will be exactly parallel to the takeup spool, and means for assuring tight sealing to the axial pneumatic connection of the tracker hole in the takeup spool. Another feature is to use the drive for rewind as a brake against overrunning in winding on the takeup spool with or without electrical energizing. An alternate and improved form of sealing is provided for an elastomer diaphragm of a differential pressure valve. An abrupt bend is provided at the circumference on the takeup spool to prevent oscillation of the roll tab and the control strip connected to the roll tab. An improvement in combined pneumatic and electric circuitry for operating the programmed control device is provided, including double-pole, double-throw switches which provide interlocks against antagonistic operation of parts of the device which might damage it.

---

The present invention relates to programmed control devices of the type which control by a preforated control strip engaging a tracker bar, and are suitable for example for control of machine tools control of testing equipment, control of electrical devices such as electric signs, Jacquard mechanism, and particularly for player pianos, organs and other musical instruments.

A purpose of the invention is to provide an improved spool box in which the spool having the control strip thereon is unwound by cross connecting the sides of the spool box through a pair of spaced semicylindrical bottom portions which protect against loss of parallelism in the sides.

A further purpose is to make an improved pneumatic connection to the takeup spool by providing a conical pneumatic seat at one end of the takeup spool connected to the spool hole, and making pneumatic connection to it by a tapered hollow conical center which also determines the axis of the takeup spool.

A further purpose is to assure that the roll having the control strip initially wound thereon and the takeup spool are maintained parallel and that the edge of the control strip is correctly aligned with the flange of the takeup spool by providing an aligning center and an adjustable center for the roll with rewind connections to the roll.

A further purpose in unwinding the control strip from the roll and winding it on the takeup spool is to maintain the rewind means connected to the roll so as to act as a brake against overrunning by the control strip with or without electrical energizing.

A further purpose is to provide an improved and alternate seal for an elastomer diaphragm in a differential valve.

A further purpose is to suppress oscillation of the roll tab and the adjoining forward end of the control strip as it winds on the takeup spool by bending the control tab abruptly over a shoulder at the outer circumference of the hub of the takeup spool and winding on the takeup spool in a direction to maintain this relationship.

The following purposes relate to a programmed control device having a spool box, a roll in the spool box having a control strip thereon, means for mounting the roll on the spool box, a tracker bar on the spool box having holes in position to engage the control strip, a takeup spool operatively mounted to rotate the spool box and wind the control strip, means including a clutch for driving the spool, a clutch solenoid for engaging and disengaging the clutch, a plurality of pneumatic valves and pneumatics having control connections to holes in the tracker bar, a vacuum blower, a plenum connection from the vacuum of the vacuum blower to the pneumatic valves, a spool hole operatively connected through the spool to respond to the control strip, and a pair of relays for operating the device.

A further purpose is to provide a vacuum switch operatively connected to the spool hole, a vacuum shutoff valve adapted in one position to shut off the plenum connections to the pneumatic valves, a relay valve on one of the relays operatively connected to the vacuum shutoff valve, and means operatively connecting the relay and the vacuum switch to energize the relay and operate the vacuum switch to cut off the plenum connections to the pneumatic valves when the spool hole is uncovered.

A further purpose is to provide a vacuum switch operatively connected to the spool hole, electric circuit connections through the second relay for energizing the clutch solenoid to engage the clutch, electric circuit connections through the vacuum switch and the first relay for energizing the first relay when the spool hole is uncovered and alternate circuit connections through the first relay when deenergized and through the second relay for energizing the clutch solenoid to engage the clutch when the spool hole is covered, both the first and second relays being deenergized when the spool hole and tracker bar reroll hole are uncovered.

A further purpose is to provide a reroll hole on the tracker bar in position to engage the control strip, a reroll motor for rerolling the roll, a vacuum switch operatively connected to the reroll hole in the tracker bar, both of the relays having normally closed contacts, circuit means through the normally closed contacts of the first relay and the normally closed contacts of the second relay for energizing the clutch solenoid to play the roll and circuit means through the vacuum switch when it is closed through the relay coil of the second relay and through the reroll motor to energize and latch the second relay and energize the reroll motor through normally closed contacts of the first relay.

A further purpose where both relays have normally closed contacts is to provide a reroll motor operatively connected to the spool, a reject switch and circuit connections from the reject switch through the second relay for energizing and latching the second relay, deenergizing the clutch solenoid and energizing the reroll motor.

A further purpose where both the first and second relays have normally closed contacts is to provide electric circuit means extending through the normally closed contacts of the second relay for energizing the clutch solenoid and energizing the clutch, electric circuit means through the vacuum switch for energizing the first relay when the spool hole is uncovered, electric circuit means through the normally closed contact means of the first relay and the normally closed contact means of the second relay for energizing the clutch solenoid when the spool hole is covered and the vacuum switch is open, a replay switch, and electric circuit means through the replay switch when closed for energizing the first relay, the replay switch when opened permitting the first relay to deenergize and the clutch solenoid to energize.

A further purpose where some of the pneumatic valves include action valves is to provide a cancel valve having pneumatically operative connections to the action valves for restoring the action valves to inactive position, to provide a general cancel valve operatively connected to actuate the cancel valve and electric circuit (general cancel switch) means for actuating the general cancel valve.

A further purpose is to provide a double-pole, double-throw interlock selector switch (start-reject switch) having an A position closing one pole, an intermediate off position and a B position closing the other pole which will provide an interlock, both of the relays being normally closed, electric circuit means closed by the vacuum switch for energizing the first relay, electric circuit means including the interlock selector switch closed in the A position and the second relay in normally closed position for energizing the clutch solenoid and engaging the clutch, a reroll motor operatively connected to the roll, and electric circuit means energized when another pole of the selector switch is closed in the B position for energizing and locking the second relay to break the circuit through the clutch solenoid and to energize the reroll motor through a normally closed contact of the first relay.

A further purpose is to provide an interlock selector switch of double-pole, double throw type (repeat-single play-replay switch) having an A position in which one pole is closed, an intermediate off position and a B position in which the other pole is closed, the first and second relays being normally closed, and electric circuit means through one pole of the interlock selector switch in the A position and through the second relay for energizing the clutch solenoid and through another pole of the interlock selector switch in the B position for energizing the first relay as a step toward replay.

A further purpose is to provide an interlock selector switch of double-pole (normal-stop-general cancel switch) double-throw type having one pole which closes in A position, an intermediate Off position, and both poles which close in the B position, electric circuit means through the interlock selector switch in the A position for energizing the clutch solenoid and playing the roll, the intermediate Off position of the selector switch interrupting the circuit of the clutch solenoid and deactivating the cluch, electric circuit means through one pole of the interlock selector switch in the B position and through both relays for energizing the clutch solenoid, a plurality of the pneumatic valves including action valves, a pneumatic cancel valve operatively connected to the source of vacuum and to the tracker bar and to the action valve for restoring the action valves to inactive position, a general cancel solenoid valve operatively connected to the cancel valve, and electric circuit means through another pole of the interlock selector switch in the B position and through the general cancel solenoid valve for energizing the cancel valve and cancelling action by the action valves, the interlock selector switch interlocking normal play as opposed to general cancellation.

A further purpose in an alternate form when the spool hole is open is to energize a relay and thus energize the clutch solenoid so as to disengage the clutch from the play motor and then to start operations, disconnect the circuit through the clutch solenoid and allow the clutch to mechanically engage.

A further purpose is to operate the takeup spool to play the roll by deenergizing a relay so as to break the circuit through a clutch solenoid and allow the clutch to remain mechanically energized.

A further purpose in operation of the reroll motor is to energize a second relay to energize the reroll motor and thereby to energize the clutch solenoid so as to disengage the clutch during rewinding.

The drawings show various embodiments of the invention, the forms shown being selected from the standpoints of convenient illustration, satisfactory operation and clear demonstration of the principles involved.

FIGURE 1 is a front elevation of the spool box of the invention partially broken away and illustrating the clutch and drive diagrammatically.

FIGURE 2 is a right end elevation of the device of FIGURE 1 partially broken away.

FIGURE 3 is a section of FIGURE 1 on the line 3—3.

FIGURE 5 is a front elevation of the takeup spool of the invention.

FIGURE 6 is a front elevation of a prior art takeup spool by way of contrast.

FIGURE 7 is a plan view of a roll tab to be anchored to the end of the control strip for connection with the takeup spool.

FIGURE 8 is a diagrammatic sectional view showing the mechanism within the cancel valve and an action valve and the interconnection between the same.

FIGURE 9 is a section on the line 9—9 of FIGURE 8 omitting the valve element.

FIGURE 10 is a diagrammatic axial section of a vacuum shutoff according to the invention.

FIGURE 11 is a diagrammatic illustration of the pneumatic system of the invention.

FIGURE 12 is a diagrammatic illustration of the electrical system of the invention.

FIGURE 13 is a circuit diagram showing a modification.

FIGURE 14 is a diagrammatic fragmentary axial section of a seal for a pneumatic valve diaphragm.

FIGURE 15 is a view corresponding to FIGURE 14 showing a variation.

Figure 4:
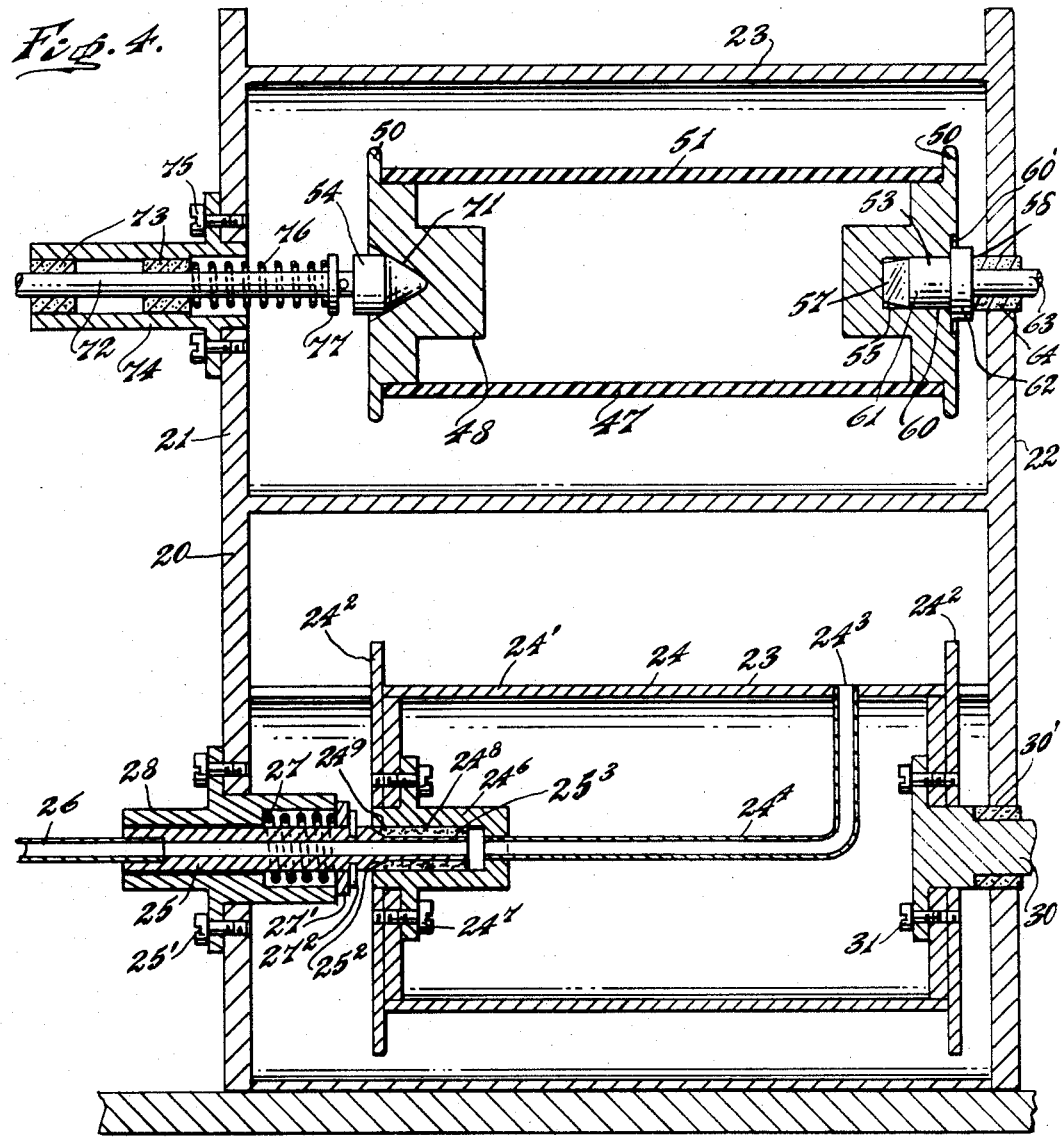
FIGURE 4 is a section of FIGURE 3 on the line 4—4 partially broken away.

Describing in illustration but not in limitation and referring to the drawings:

The present invention relates to programmed control devices which control as in a player piano by a perforated control strip cooperating with the tracker bar. While the invention is useful to control musical instruments such as pianos and organs, it is also applicable to control many other multiple function devices such as machine tools, testing equipment, electrical devices, looms, and the like.

One of the important improvements in the invention is to prevent the difficulties which have existed in the past through misalignment of the roll with respect to the takeup spool by interconnecting the sides of the spool box by curved sections such as semicylindrical ribs which will greatly increase the stiffness.

The invention also lends itself particularly to guarding against loss of vacuum in the tracker hole on the takeup spool by providing an improved air-tight center for the takeup spool.

The invention also provides an aligning center for the roll which will guard against the possibility that the control strip will not feed straight from the roll to the takeup spool.

The rewind gear train and motor connected to the roll acts as a brake against overrunning as the control strip unwinds.

More effective sealing is accomplished with respect to the diaphragm in various of the pneumatic valves.

Oscillation of the roll tab or of the forward end of the control strip as it is unwound is prevented by more effective anchorage of the roll tab to the takeup spool.

The pneumatic and electrical mechanism are greatly improved as outlined more specifically elsewhere herein.

One of the important features is the utilization of double-pole, double-throw switches to provide interlock and prevent the possibility that antagonistic connections could be made which would tend to destroy or disrupt the mechanism.

Considering now the drawings in detail, a spool box 20 suitably of a metal such as aluminum, has sides 21 and 22 which are cross connected at the bottom by inwardly concave semi-cylindrical or other curved ribs 23 integral or joined to the sides as by welding and maintaining parallelism of the sides and rigidity of the structure due to the depth of section of the semi-cylindrical portions.

A takeup spool 24 provided with a hub 24' and flanges 24² has a spool hole 24³ at a proper location on the hub to permit rapid covering by the control paper or other strip. The spool hole is connected by a vacuum tight tube 24⁴ running through its interior and mounted and vacuum sealed at the axis in a bearing retainer 24⁶ on one of the flanges, the mounting being accomplished suitably by screws 24⁷. The bearing retainer 24⁶ also receives a coaxial bearing 24⁸ having a center opening and a conical seat 24⁹ to receive a vacuum tight centering tube 25 mounted on the spool box by a housing 28 secured as by screws 25' and having at the forward end a conical centering portion 25² and an elongated tubular portion 25³ of reduced diameter which makes a vacuum tight seal inside the bearing 24⁸ and with the spool hole tube 24⁴. The tube 25 is retractable and is connected to a flexible tube 26 which runs to a suitable vacuum switch to be described. The tube 25 is resiliently urged into seating engagement in the conical seat 24⁹ of the bearing 24⁸ by a helical compression spring 27 acting in a suitable recess in the housing 28 for the tube 25, the spring 27 acting against a spring retaining washer 27' and a retainer 27².

The opposite end of the takeup spool 24 mounts a stub shaft 30 held by screws 31 and journalling in a bearing 30' in the opposite side of the spool box. The stub shaft 30 beyond the spool box has keyed thereon a gear 32 which when the clutch is in engaging position is driven by play motor 144 through speed reducer 33 driving output shaft 34 which has keyed thereon gear 34'. Gear 34' is constantly in mesh with clutch gear 35 which is rotatable on shaft 36 which is pivotally mounted on clutch arm 37 swingable about shaft 34. Clutch arm 37 is pivotally connected at 38 to a link 40 which is pivotally connected at 41 to the end of armature 42 of clutch engaging solenoid 156 which is optionally pivotally mounted at 43 on the frame 43'.

Thus when the clutch is energized to engage movable gear 35 with gear 32, it always being in mesh with gear 34', the takeup spool 24 is turned in the direction to wind up the strip of paper or other control material on the spool 24. Helical tension spring 45 acting from spring abutment 46 pulls pivot 38 in the direction to disengage the clutch, and the clutch engages against the action of the spring when clutch engaging solenoid 156 is energized.

It should be kept in mind that when using the circuit of FIGURE 13, the spring 45 should act in the opposite direction and the solenoid 156 should pull from the other side, as well known.

At the opposite side of the spool box a roll 47 such as a piano roll consisting of a roll spool 48 having flanges 50 and a hub 51 and also having around the hub as shown in FIGURE 3 a perforated control strip 52 such as a paper strip, is mounted between a reroll driving center 53 and an opposite center 54, the axis of the roll 47 being precisely parallel to that of the takeup spool 24 and the flanges 50 of the roll being precisely aligned with respect to the flanges 24² of the spool 24.

At the driving end the roll spool 48 has a transverse center slot 55 into which rewind driving lugs 57 of the reroll driving center 53 are received. The driving lug engages the slot. Centrally the reroll driving center 53 has a cylindrical boss 61 which engages a center cylindrical socket portion 60 of the reroll driving center 53. The reroll driving center 53 has a flange 62 which aligns with an end portion 60' of the adjoining roll spool flange 50.

The reroll driving center 53 is on a shaft 63 journalled in a bearing 64 in the side 22 of the spool box. The shaft 63 has fixed thereon a gear 65 which is in mesh with a gear 66 on a shaft 67 suitably journalled and having keyed thereon a gear 68 which meshes with a pinion 70 on the shaft of reroll motor 150.

At the opposite end the roll spool 48 has a conical center socket 71 which engages the forward conical end of center 54. The center is mounted on shaft 72 journalled in bearings 73 mounted in a bearing support 74 on the side of the spool box by screws 75 and urged toward the live center by helical compression spring 76 acting from one of the bearings against a collar 77 on the shaft. A head 78 prevents removal of the shaft when no roll is in place in the spool box.

Mounted firmly between the two sides of the spool box and permissibly with adjustment, and automatic tracking, as well known in the art, if desired, is a tracker bar 80 having numerous tracker openings 102 and other special openings to be described and subject to control by the presence or absence of perforations in the control strip 52. On each side of the tracker bar is a control strip guide bar 81 or 82 having adjustable collars 83 or 84 thereon which are adapted to be precisely aligned with the sides of the control strip corresponding with the flanges on the takeup spool and on the roll spool. The takeup spool of the invention has a shoulder 85 best seen in FIGURES 3 and 5 which extends generally parallel to a radius and has a shoulder wall 86 which is provided with an eyelet engaging hook 87 which is intended to receive an eyelet 88 (FIGURE 7) of a roll tab 90 so as to form a sharp bend at 91 and anchor the roll tab and the forward end of the control strip against lateral oscillation.

Thus in threading the roll the center 54 is pushed out against the action of the spring and the roll spool is inserted in reroll driving engagement with the reroll driving center 53. Then the control strip or paper strip is pulled out, usually grasping the tab 90, bent sharply over the shoulder 85 and the eyelet 88 hooked on the hook 87 so that as the takeup spool advances to unwind the control strip from the roll the sharp bend at 91 will be retained and lateral oscillation will be reduced.

FIGURE 6 shows a prior art type of takeup spool 92 having a hub 93 and flanges 94. The hub at the center has an annular recess 95 which has a hook 96 adapted to engage the eyelet 88 on the roll tab, but in this form there is no tendency to suppress lateral oscillation which occurs rather freely.

Accordingly, in the invention the improved anchorage and the improved takeup spool guards against difficult through unintended lateral motion.

FIGURE 11 is a general schematic view of the device of the invention. A plurality of key playing valves 100, suitably one for each key, of any well known construction, but preferably of the construction shown in James S. Ballantine U.S. patent application Ser. No. 682,403, filed Nov. 13, 1967, for Programmed Control Device, are operatively connected to pneumatics (bellows) 101 which manipulate the keys or other devices in any well known manner. The valves 100 have diaphragms and internal bleeds. Tracker bar openings 102 connect by suitable tubing to a control pressure chamber in the valves 100 on one side of the diaphragm, and vacuum connections 103 are made through a vacuum shutoff valve 104 of the well known type, provided with an internal bleed, to a vacuum blower 105.

There is a fixed bleed 106 connecting vacuum piping 107 to atmosphere for cooling the blower motor where required. In the takeup spool, there is a continue-play-and-reroll stop spool opening 24³ which connects through vacuum switch VS–1 (provided with an internal bleed around or through the diaphragm) to the vacuum piping 107. There also is a tracker bar reroll hole 110 which connects through suitable tubing with the control pressure side of vacuum switch VS–2 which is provided with a normal internal bleed and a connection from the opposite side of the vacuum piping 107.

The vacuum shutoff switch 104 as shown in FIGURE 10 has a diaphragm 104' with a bleed 104². It is connected to the blower on one side of the diaphragm by a pipe 105' and has a control pressure connection on the other side of the diaphragm to pneumatic piping 109 for relay valve 111 and relay valve 112. There is also a connection to piping 103 which is closed by the diaphragm 104' when it is in expanded position. Relay pneumatic valves 111 and 112 are normally closed when the relays are deenergized and either one of them when energized will open and actuate the vacuum shutoff valve 104 to shut off the vacuum from pipe 103. This prevents the piano from playing during the initial phases of starting operation of the device and also during the rewind cycle.

An action valve 113, which is typical of construction of action valves 117 and 121, also is provided with a diaphragm but no bleed. One side of the diaphragm is connected to vacuum piping 103 and the other side of the diaphragm is connected by piping 114 to cancel valve 115, as shown in FIGURES 8 and 9. The action valve 113 is shown in FIGURE 8 and includes a diaphragm 127 separating two chambers, one of which is a control pressure chamber 128, and the other of which is a plenum chamber 129. A suitable tappet 130 extends into the plenum chamber but is not provided with any bleed.

Into the control pressure chamber extends a pipe connection from tracker bar hole 116, and also from the control pressure chamber extends the pipe connection 114. There is a normally closed atmospheric bleed port 131 into the control pressure chamber, having a bleed size which is substantially smaller than the size of pipe 114, the bleed at 131 being about the size of the tracker bar opening 116.

The action valve tappet 130 communicates through a plenum port 132 within a plenum seat 133 which in retracted position of the diaphragm is closed by a valve 134, the valve leaving normally open an atmospheric port 135. The tappet 130 and the stem of valve 134 are guided as by spiders. The chamber around the valve is connected to an exhaust port 136 from any suitable pneumatic (not shown) operated by the action valve 113, which in this case may, for example, control the soft pedal of the piano. When the action valve 113 is energized by opening tracker bar hole 116 through the presence of a perforation in the paper, or other control strip, the diaphragm 127 shifts valve 134 to close the atmospheric port 135 and introduces vacuum into the exhaust port 136 communicating with the pneumatic, collapsing the pneumatic. At the same time, the action valve in effect latches open since atmospheric bleed 131 admits atmosphere to control chamber 128, thus maintaining the action valve in energized position notwithstanding that the tracker bar hole may later be closed.

The cancel valve 115 shown in FIGURES 8 and 9 is provided with a diaphragm 137 and a hollow tappet 138 at the center of the diaphragm provided with a side bleed 139. Tracker bar hole 124 is connected to the control pressure side of diaphragh 137. The opposite side of the diaphragm is connected to piping 103. There is operated by the tappet 138 a valve 139' urged by spring 139² or otherwise toward a plurality of seats, one of which is connected to piping 114 from action valve 113 and others are connected to similar piping 118 and 122 from other action valves 117 and 121 to be described. In inactive position, when tracker bar hole 124 is closed, all of the connections 114, 118 and 122 to action valves are closed, vacuum being admitted to the space around valve 139' through vacuum port 139³. When, however, the cancel valve is energized, it opens piping 114 to the control pressure side of action valve 113 and takes similar action for other valves 117 and 121 and thus admits vacuum to the control pressure sides of the action valves and retracts the action valves notwithstanding the atmospheric bleeds 131 which are of smaller diameter and therefore not effective to maintain atmosphere in the control pressure chamber 128. Thus it will be evident that the action valve 113 is actuated to initiate action and the cancel valve 115 is actuated to terminate action. The cancel valve signal is also used at the beginning of the operation of each playing roll to clear all previous action.

Other suitable action valves are included which, as well known, may initiate other action. For example, action valve 117 which will preferably be the same as that shown in FIGURE 8 is connected in a similar way, having a pipe 118 which extends to a cancel valve port and which may conveniently operate a sustained action. Action valve 117 is controlled by a tracker bar hole 120.

Action valve 121 has a piping connection 122 to the cancel valve port and this is controlled by tracker bar hole 123 and may, for example, initiate a mandolin attachment. A general cancel solenoid valve 126 is normally closed but when energized opens a hole 125 and cancels all action. It will be evident that the cancel valve in effect supplies the control bleed upon demand for the action valves.

FIGURE 12 shows a diagrammatic electric circuit for operation of the device. Power leads 140 and 141 are connected to a suitable power source, preferably a commercial alternating or direct current source at 110 volts, for example. Lead 141 is in series with main switch S1, provided with an illuminating indicator 142 across the power lines. Switch S1 is a single-pole, single-throw switch. Vacuum blower 105 is connected across leads 140 and 141 in series with a suitable motor speed control (volume control) 143.

The winding spool for the paper or other strip is driven by play motor 144 which is in series with a suitable motor speed control (tempo control) 145 across leads 140 and 141.

Also connected across the power leads is a thermal delay relay 146 which is normally open and has a heater coil 147 across the power leads and has suitably thermostatically controlled normally open contacts 148.

Switch S2 is a three-position switch, position A serving as a Start switch, the intermediate position serving as an Off position switch and position B serving as a Reject switch. Position A and position B are both momentary contact switches. This is a double-pole, double-throw, center-off switch. It will be evident that switch S2, while a double-pole switch, functions as a mechanical interlock between circuits, one pole of the double-pole switch being used on one side and the other pole of the double-pole switch being used on the other side. The Start or A part of switch S2 is normally open and is connected between one side of thermal relay contacts 148 and lead 141. The Reject or B portion of switch S2 is normally open and is connected between lead 140 and one side of reroll motor 150. Switch S2 is normally in its intermediate or Off position.

Switch S3 in its A position is a Repeat switch and in its B position is a Replay switch. Switch S3 in its normal or Off position is in Single Play mode. It is an On-Off momentary closed, three-position, double-throw switch and similar to switch S2, provides a mechanical interlock function. The A position or Repeat switch position of switch S3 is connected between one side of thermal delay relay contacts 148 and power lead 141.

In the Single Play position, switch S3 is off. In the Replay or B position of switch S3 it is momentarily closed and is connected between power lead 140 and one side of relay coil 151 of relay 111.

Switch S4 is a double-pole, double-throw switch, which is an on-off-on and is used for the purpose of interlock, one pole being used in each "On" position.

The A or Normal Play position of switch S4 is closed and has opposed fixed contacts each of which is connected by lead 153 with one of the normally closed contacts of relay 112, the other side of the normally closed contacts of relay 112 being connected to power lead 140.

The movable contact of switch S4 in the A position is connected by lead 155 with one side of clutch engaging solenoid 156, the other side of the clutch engaging solenoid 156 being connected through lead 157 to the side of thermal delay relay contacts 148 remote from switch S2–A and from switch S3–A.

Switch S4 in its B position acts as a General Cancel and is connected at one side to power lead 140 and at the other side by lead 158 to one side of solenoid 160 of General Cancel solenoid valve 126, the other side of solenoid 160 being connected to power lead 141.

Vacuum switch VS–1 is of a normally open type responding to the hole in the spool, and its electrical connection at one side is to power lead 140 and at the other side to power lead 141 through relay coil 151 of relay 111.

Vacuum switch VS–2 is of normally open type and operated pneumatically by the Reroll Control hole on the tracker bar. It is connected electrically at one side to power lead 140 and at the other side to one side of relay coil 161 of relay 112, the normally open contact of this relay and also to the reroll motor 150. The opposite side of relay coil 161 is connected to the side of reroll motor 150 remote from switch S2–B and vacuum switch VS–2 and is also connected to fixed normally closed A contact of relay 111.

The movable normally closed A contact of relay 111 is connected to movable normally closed B contact of the same relay and to power lead 141. The fixed normally closed B contact of relay 111 is connected to the side of thermal delay relay contacts 148 remote from power lead 140. It should be noted that relay 11 is electrically a double-pole, single-throw relay, although additional poles can be employed if desired for other purposes and it also has on it a pneumatic valve previously described.

Relay 112 is a single-pole, double-throw relay, which can have additional contacts if needed and also has the pneumatic valve before described.

The first phase of operation of the device is initiated when main switch S1 is closed, energizing vacuum blower 105, play motor 144 and heater coil 147 of thermal delay relay 146. No other action takes place since the system has not yet come under vacuum by operation of the vacuum blower.

After the time delay relay times out, it closes the contacts 148. Vacuum has been established in the vacuum system also.

It will be evident that the starting operation will be the same whether or not paper is on the tracker bar and over the spool hole. Vacuum switch VS–1 closes, energizing relay 111 to open both its A and B contacts and also to open the relay valve 111 which shuts off the vacuum shut off valve 104 if there is no paper on the tracker bar. Vacuum switch VS–2 closes.

When the paper or other strip material is placed in contact with the tracker bar, the reroll hole 110 on the tracker bar is closed, causing vacuum switch VS–2 to deenergize and removing power from the one side of relay coil 161 of relay 112. The spool hole $24^3$ is open and vacuum switch VS–1 remains closed. In this previous action, the paper or other strip material has been brought into operative contact with the spool by hooking it to the spool-engaging hook.

Now when Start switch S2 is closed by moving it into the A position, and the device is in Single Play mode due to opening switch S3–A and when Normal S4 is also in the A position by manual action of the person playing the piano, the play cycle starts by energizing clutch solenoid 156 through Start switch S2–A and through Normal switch S4–A.

As playing starts, the spool hole $24^3$ is closed by the paper or other strip material, causing vacuum switch VS–1 to open, deenergizing relay 111 which shifts to its normally closed position. The person operating the player piano can then remove his finger from switch S2–A which automatically spring returns to its intermediate or "off" position, but clutch solenoid 156 remain energized through the normally closed B contact of relay 111.

The playing continues by the pneumatic operation of the differential pressure valves and pneumatics as well known in the art until vacuum switch VS–2 is closed by its hole 110 in the tracker bar encountering an open perforation (reroll hole). Relay coil 161 is energized by vacuum switch VS–2, and normally closed A contacts of relay 111, and relay 112 shifts to its normally open position, and reroll motor 150 is energized. The energizing of relay 112 deenergizes clutch solenoid 156 by opening its normally closed contacts. Relay 112 electrically latches in energized position to continue the operation of reroll motor 150 after tracker bar hole 110 ceases to be open and vacuum switch VS–2 ceases to be closed and in this condition the reroll motor is energized through the now closed normally open contacts of relay 112 and the normally closed A contacts of relay 111.

Relay valve 112 causes vacuum shutoff valve 104 to energize and shuts off vacuum from the system so that playing will not occur during reroll. It should be kept in mind, however, that vacuum line 107 is not controlled by the vacuum shut off valve 104 and is never shut off during operation of the vacuum blower.

In the Single Play mode which has been established by the position of switch S3, vacuum switch VS–1 closes through the opening of spool hole $24^3$. This energizes relay coil 151 of relay 111, opening both normally closed relay contacts. This disconnects motor 150 and deenergizes relay 112. Relay 112 electrically unlatches and this opens the circuit of reroll motor 150 and stops the unit at the end of a single play. The paper remains hooked to the spool.

If Repeat Play is desired, switch S3 is shifted to its A position, bypassing the B contacts of relay 111, and energizing clutch solenoid 156 through the closed contacts of the time delay relay and the normally closed contacts of relay 112. This restores the Play Cycle. It will be evident that when relay 111 energizes and relay 112 deenergizes, the former activity of relay valve 112 to operate the vacuum shutoff valve 104 is taken over by relay valve 111 and vacuum continues to be shut off.

Assuming now it is desired to reject during the Play Cycle, switch S2 is shifted to its B position and this closes switch S2–B and energizes relay 112 through normally closed A contacts of relay 111. When once energized, relay 112 electrically latches. The clutch solenoid 156 is deenergized by opening the normally closed contacts of relay 112 and rewind motor 150 is then energized through reject switch S2–B and the normally closed A contacts of relay 111. As soon as relay 112 is energized, a parallel path is provided through the now closed normally open contact of relay 112. The unit now rerolls and terminates the reroll cycle when vacuum switch VS–1 opens by uncovering the spool hole as previously described.

The intermediate or Off position of switch S4 acts as an instruction stop. This places switch S4 in an open position and discontinues the circuit through clutch solenoid 156. The roll stops at that position and operation can be restarted by moving switch S4 to the A or Normal position at which the roll will continue to play, or by moving switch S4 to the B General Cancel position, to be described. This switch is normally used only during the Play Cycle.

To replay, switch S3 is thrown into the B position, which causes it to energize relay 111, moving its contacts to open position. This interrupts the reroll cycle. The Play Cycle will not be started until switch S3–B is returned to the Single Play or Repeat Play position, which denergizes relay 111 and returns it to its normally closed position and closes the circuit through the B contact to the clutch solenoid. Returning switch S3 to Off or to the Repeat position, initiates the Play Cycle.

For General Cancel, switch S4 is shifted to its B position, and this energizes General Cancel solenoid valve 126 through lead 158 to its coil 160. In this position, bleed opening 125 is opened to energize Cancel valve 115 and restore the action valves 113, 117 and 121 to their inactive position and maintain them in their inactive positions, providing vacuum through pipes 114, 118 and 122. This permits elimination of any action which has been previously established and prevents any action from being established.

Figure 13A:
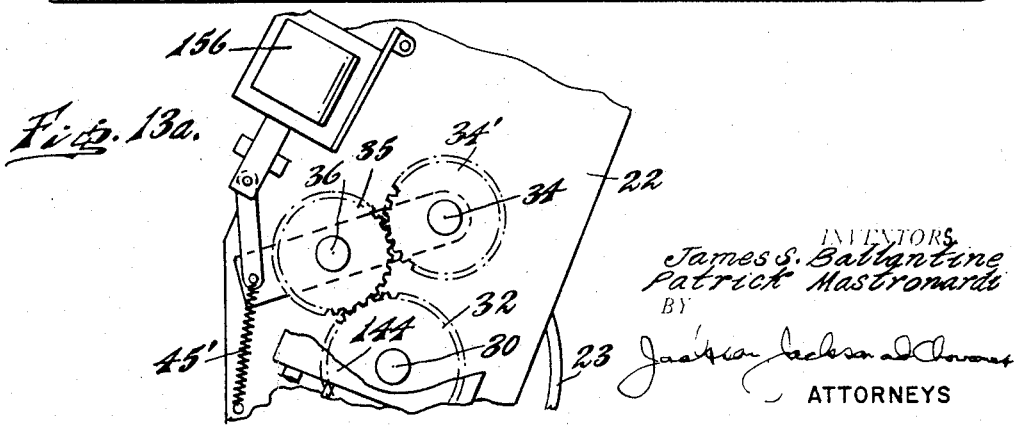
FIGURE 13a is a fragmentary end elevation similar to FIGURE 2 showing the clutch modified to agree with FIGURE 13.

FIGURE 13 illustrates a variation in the device of the invention in which the clutch solenoid tends to disconnect the clutch and the clutch is urged toward engagement by a spring. Accordingly, various modifications are made in the circuitry as shown in FIGURE 13. FIGURE 13a shows the action of the clutch solenoid 144' and the spring 45' reversed so that the clutch solenoid engages to declutch.

Across the electrical leads 140 and 141 is a series of electrical components resembling those shown in FIGURE 12. An indicating device 142 to show that the system is operating is placed across the leads beyond the main switch S1. The motor of blower of 105 in series with its volume control 143 is connected to leads 140 and 141. A time delay relay having a heater coil 147 is also connected across the power leads 140 and 141 and when it times out it closes the time delay relay contacts 148 which are in series across the line with play motor 144 and its tempo control 145 as well known in the art.

Switch S2 is a single-pole, double-throw switch, the A position being momentarily Off, intermediate position being On and the B position being Off.

Relay 111' has a relay coil 151. It is a double-pole, double-throw relay; the A pole is normally closed, the B pole is normally closed but not utilized and the B pole closes in the energized position.

A second relay 112' in this case is a double-pole, double-throw relay, the A pole being normally open and the B pole being normally open. A double-pole, double-throw switch S4 has one pole in the A position which is normally closed and is electrically in series across the line with clutch solenoid 156 and the intermediate closed position corresponding to Single Play of switch S2, and then when relay 111' is energized through its then closed B contact to the opposite side of the line. Switch S4–A and clutch solenoid 156 are also connected through latching relay 112' in the A position when this relay is energized to relay 111' in the A position when deenergized and then to the opposite side of the line.

The relay coil 151 of relay 111' can be alternately energized by closing of vacuum switch VS–1 or by moving double-pole, double-throw switch S3 to the B position in which its opposite pole is closed, this switch having an A position in which its other pole is closed. Switch S3 when closed in the A position connects the reroll motor to one side of the power line, the other side being connected to one side of the reroll motor 150 to one side of relay coil 161 of relay 112' and to a normally open B contact of relay 112' which when closed connects to lead 140. A vacuum switch VS–2 responsive to the tracker bar reroll hole when closed connects from lead 140 to the same side of the reroll motor 150. The other side of reroll motor 150 connects to the opposite side of relay coil 161 and to lead 141 through the A contact of relay 111' when normally closed and also to lead 140 through the A contact of latching relay 112' when energized, which in turn connects through the clutch solenoid and switch S4–A with lead 140.

The opposite pole of switch S4 from that connected to the A position, when closed in the B position acts as a General Cancel switch connecting lead 140 through lead 158 to the solenoid coil of General Cancel solenoid valve 126 and to lead 141. The first pole of switch S4 in the B position connects lead 140 with clutch solenoid 156.

In starting up the device as shown in FIGURE 13, when there is no vacuum, closing switch S1 energizes the heater coil 147 of the time delay relay and at the same time starts blower 105.

If the spool hole is open switch VS–1 closes when vacuum is attained prior to the time the time delay relay contacts 148 have been closed by its heater coil, and play motor 144 is started. Vacuum switch VS–1 by closing energizes relay coil 151 of relay 111' and switch S2 is in its intermediate or closed position, energization of relay 111' energizes clutch solenoid 156 through the now closed B contacts of relay 111' and through switch S4 closed in the Normal or A position or General Cancel position. Of course, this would not happen if switch S2 were in its B or Repeat position. If there is no paper on the tracker bar, the reroll hole is open and switch VS–2 is also closed, but if there is paper on the tracker bar switch VS–2 will be open.

Now to start playing, switch S2 is thrown to its A or momentary Off position. This disconnects the circuit through the clutch solenoid and the spring engages the clutch and advances the player roll. Switch S2 is held in the A position until the spool hole is covered at which time vacuum switch VS–1 opens and this deenergizes relay 111'.

Now switch S2 is returned manually to its intermediate or closed position for Single Play, but since relay 111' is deenergized the clutch solenoid is no longer energized (the circuit being broken by the B contact of relay 111'). The clutch remains engaged due to its spring and the play motor drives the takeup roll to play the roll.

When the roll has been completely played, the reroll hole on the tracker bar is energized by the reroll perforations on the control strip, and this energizes and latches relay 112' through closed vacuum switch VS–2 and normally closed A contact of relay 111'. Then as soon as relay 112' is energized it remains energized through its then closed B contact, and through the normally closed A contact of relay 111'.

The reroll motor is now energized through vacuum switch VS–2 and normally closed A contact of relay 111' and the clutch solenoid is energized through this same contact and through the now closed A contact of relay 112 until the spool hole closes vacuum switch VS–1 to operate and energize relay 111' and thus releases and unlocks relay 112'.

If switch S2 is thrown to the B position where it is Off, Repeat Play will occur since the clutch solenoid cannot be energized through the B contact of relay 111' when this relay is energized and therefore will engage and cause Replay when the spool hole causes vacuum switch VS–1 to close. If, on the other hand, switch S2 is in the single playing or center on position, then when the spool hole closes vacuum switch VS–1 and energizes relay 111' the clutch solenoid will be energized and will limit to Single Play.

In many pneumatic valves having diaphragms there has been a tendency to force the diaphragm inward when it is sealed by the housing and this tends to create a residual stress in the diaphragm which biases the diaphragm undesirably toward one or the other direction.

We propose to improve this feature as shown in FIGURES 14 and 15. In this instance the diaphragm 170 is shown only partially, omitting the tappet 138 shown in FIGURE 9 and omitting any bleed through the tappet. The central part of the diaphragm may, if desired, be a piston 171 surrounded by convolutions 172 joining with the piston by curved surfaces. These features are not part of the present invention.

Around the outside the diaphragm has a bulbous rim 173 as shown in FIGURE 14 in which it is curved on the top or as shown at 173' in FIGURE 15 in which it terminates at the upper outside portion in a sharp shoulder.

The diaphragm is contained within a surrounding housing 174 suitably of metal or rigid plastic, there being telescoping parts 175 and 176. The part 176 has an interior axially extending flange 177 which telescopes within an outer axially extending flange 178 of the housing portion 175. The flange 177 has an end extending transversely and exerting sealing pressure on the lower portion of the diaphragm rim 173 or 173′. It is evident that as the diaphragm convolution is in tension when actuated an increase in seating pressure will result as rim tends to rotate.

The housing portion 175 has cooperating with the end of the flange 177 an annular recess 178 or 178′ of appropriate shape to fit the rim having a wall 180 sloping toward the interior of the housing and also toward the opposite housing portion 176 so that when the two housing portions are axially pressed together under any suitable pressure as from a strongback, the surface 180 will tend to cam the bulbous rim 173 outwardly and thus prevent forcing material of the diaphragm inwardly. The diaphragm will preferably be of a suitable elastomer such as neoprene.

It will be evident that instead of the combination of a clutch solenoid and spring, the clutch can operate from a clutch motor.

It will also be evident that in this case a direct drive may be used.

It will be evident that in the pneumatic valve screens will desirably be used where bleeds are employed to guard against the possibility of blockage from foreign matter.

It will further be evident that the fact that a vacuum control is used to determine the presence of a control strip on the spool, rather than a switch or other device physically engaging the control strip, makes it possible for the mechanism to function without the possibility of damage to the control strip.

In view of my invention and disclosure, variations and modifications to meet individual whim or particular need will doubtless become evident to others skilled in the art to obtain all or part of the benefits of my invention without copying the mechanism shown, and I, therefore, claim all such insofar as they fall within the reasonable spirit and scope of my claims.

Having thus described my invention, what I claim as new and desire to secure by Letters Patent is:

1. In a spool box, a housing, a tracker bar positioned across the housing, means for operatively mounting a roll of perforated control strip thereon in position adjacent the tracker bar, a takeup spool adapted to unwind paper from the spool as it passes over the tracker bar, the takeup spool having a hub portion and flanges, a tracker hole on the hub portion of the takeup spool adapted to respond to the control of a hole in the control strip extending inwardly through the hub and then longitudinally of the hub, an axial conical sealing seat at one end connected to the hole, a tapering hollow conical center engaging the conical seat, means for fluid connection to the tapering conical center and an opposing center for the takeup spool.

2. In a spool box, a housing, a tracker bar extending across the housing and secured thereon, a takeup spool rotatably mounted in the housing and having at one end of the spool an aligned flange to determine the edge of a control strip, means for driving the takeup spool, an aligning center for a roll of control strip having a flange which is at a predetermined distance with respect to the edge of the control strip, which edge is in alignment with the aligned flange on the takeup spool, an adjustable center for the opposite end of the roll of control strip mounted on the housing and resiliently urged toward the aligning center, the aligning center extending toward the adjustable center for center alignment of the control strip and having a driving lug for engagement with the control strip roll, and a roll of control strip mounted on the aligning center and on the adjustable center, having at the aligning center a socket which engages the aligning center flange and places the adjoining edge of the control strip in alignment with the aligned flange of the takeup spool, having in the socket a recess which engages the aligning center, and having a lug recess which engages the driving lug.

3. In a spool box, a housing, means for removably pivotally mounting a roll of control strip in the housing, including a rewind driving center, a tracker bar mounted in the housing in position to engage perforations in the control strip, a takeup spool rotatably mounted in the housing adapted to wind control strip thereon as it passes over the tracker bar and is removed from the roll, means for turning the takeup spool, and rewind means operatively connected to the rewind driving center of the roll of control strip and during winding of the control strip on the takeup spool acting as a brake against overrunning by the control strip.

4. In a differential pressure valve, a housing having housing portions provided with an annular recess on one portion, and a lip on the other portion extending axially toward the annular recess portion, said lip being outwardly tapering, and an elastomer diaphragm extending across the housing and sealed to the housing, including an annular sealing portion of bulbous cross section engaged in the recess at one side and by the lip at the other side and urged outwardly, and a septum extending from the sealing portion to the interior of the diaphragm, the diaphragm extending across the housing interior.

5. In a programmed control device, a spool box, a roll having a control strip thereon and having a roll tab provided with an anchorage opening on the strip, means for mounting the roll in the spool box, a tracker bar on the spool box in position to engage the control strip, a spool operatively mounted to rotate in the spool box and to unwind the control strip, the spool having an outer peripheral edge parallel to the axis and engaging the control strip, a radially extending shoulder inwardly directed from said edge to form an abrupt bend in the forward portion of the control strip and to damp lateral oscillation, a hook on said inwardly extending shoulder for engaging the opening in the control strip, and means for winding the roll on the spool in a direction to maintain the control strip bent over said edge.

6. In a programmed control device, a spool box, a roll having a control strip thereon, means for mounting the roll in the spool box, a tracker bar on the spool box having holes in position to engage the control strip, a spool operatively mounted to rotate in the spool box and to wind the control strip, means including a clutch for driving the spool, a clutch solenoid for engaging and disengaging the clutch, a plurality of pneumatic valves and pneumatics having control connections to holes in the tracker bar, a vacuum blower, plenum connections from the vacuum of the vacuum blower to the pneumatic valves, a special hole operatively connected through the spool to respond to the control strip, a vacuum switch operatively connected to the spool hole, a vacuum shut-off valve adapted in one position to shut off the plenum connections to the pneumatic valves, relay means including a relay valve operatively connected to the vacuum shut-off valve, and means operatively connecting the relay and the vacuum switch to energize the relay and operate the vacuum switch to cut off the plenum connections to the pneumatic valves when the spool hole is uncovered.

7. In a programmed control device, a spool box, a roll having a control strip thereon, means for mounting the roll in the spool box, a tracker bar on the spool box having holes in position to engage the control strip, a takeup spool operatively mounted to rotate in the spool box and to unwind the control strip, means including a clutch for driving the spool, a clutch solenoid for engaging and disengaging the clutch, a plurality of pneumatic valves and pneumatics having control connections to holes in the tracker bar, a vacuum blower, plenum connections from the vacuum of the vacuum blower to the pneumatic valves, a spool hole operatively connected through the spool to respond to the presence of the control strip, a vacuum switch operatively connected to the spool hole, a first relay, a second relay, electric circuit connections through the second relay for energizing the clutch solenoid to engage the clutch, electric circuit connections through the vacuum switch and the first relay for energizing the first relay when the spool hole is uncovered, and alternate circuit connections through the first relay when deenergized and through the second relay for energizing the clutch solenoid to engage the clutch when the spool hole is covered, the first relay being deenergized when the spool hole is covered and providing an alternate circuit for the clutch solenoid.

8. In a programmed control device, a spool box, a roll having a control strip thereon, means for mounting the roll in the spool box, a tracker bar on the spool box having holes including a reroll hole in position to engage the control strip, a spool operatively mounted to rotate in the spool box and to unwind the control strip, means including a clutch for driving the spool, a clutch solenoid for engaging and disengaging the clutch, means including a reroll motor for rerolling the roll, a plurality of pneumatic valves and pneumatics having control connections to holes in the tracker bar, a vacuum blower, plenum connections from the vacuum of the vacuum blower to the pneumatice valves, a vacuum switch operatively connected to the reroll hole in the tracker bar, a first relay having normally closed contact means, a second relay having normally closed contact means, circuit means through normally closed contact means of the first relay and normally closed contact means of the second relay for actuating the clutch solenoid to play the roll, and closed, through the relay coil of the second relay and through the reroll motor to energize and latch the second relay and energize the reroll motor through normally closed contact means of the first relay and the now closed contact means of the second relay.

9. A programmed control device of claim 8, in which the reroll motor is connected to the roll during playing and acts as a tensioning device.

10. In a programmed control device, a spool box, a roll having a control strip thereon, means for mounting the roll in the spool box, a tracker bar on the spool box having holes in position to engage the control strip, a spool operatively mounted to rotate in the spool box and to unwind the control strip, means including a clutch for driving the spool, a clutch solenoid for engaging and disengaging the clutch, a plurality of pneumatic valves and pneumatics having control connections to holes in the tracker bar, a vacuum blower, a plenum connections from the vacuum of the vacuum blower to the pneumatic valves, a first relay having normally closed contact means, a second relay having normally closed contact means, a reroll motor operatively connected to the spool, a reject switch and circuit connections from the reject switch through the second relay for energizing and latching the second relay, deenergizing the clutch solenoid and energizing the reroll motor.

11. In a programmed control device, a spool box, a roll having a control strip thereon, means for mounting the roll in the spool box, a tracker bar on the spool box having holes in position to engage the control strip, one of which is a replay hole, a spool operatively mounted to rotate in the spool box and to unwind the control strip, means including a clutch for driving the spool, a clutch solenoid for engaging and disengaging the clutch, a plurality of pneumatic valves and pneumatics having control connections to the holes in the tracker bar, a vacuum blower, plenum connections from the vacuum of the vacuum blower to the pneumatic valves, a spool hole operatively connected through the spool to respond to the control strip, a vacuum switch operatively connected to the spool hole, a vacuum switch operatively connected to the replay hole, a first relay having normally closed contact means, a second latching relay having normally closed contact means, electric circuit means extending through the normally closed contact means of the second relay for energizing the clutch solenoid, electric circuit means through the vacuum switch for energizing the first relay when the spool hole is uncovered, electric circuit means through the normally closed contact means of the first relay and the normally closed contact means of the second relay for energizing the clutch solenoid when the spool hole and tracker bar replay holes are covered and the vacuum switches are open, a replay switch, and electric circuit means through the replay switch when closed during the reroll cycle for energizing the first relay, interrupting the reroll cycle by deenergizing the reroll motor notwithstanding that the vacuum switch is open due to a closed spool hole, the replay switch when open permitting the first relay to deenergize and the clutch solenoid to energize.

12. In a programmed control device, a spool box, a roll having a control strip thereon, means for mounting the roll in the spool box, a tracker bar on the spool box having holes in position to engage the control strip, a spool operatively mounted to rotate in the spool box and to wind the control strip, driving means for the spool, a plurality of pneumatic valves and pneumatics having control connections to holes in the tracker bar including action valves, a vacuum blower, connections from the vacuum of the vacuum blower to the pneumatic valves, a cancel valve having pneumatically operative connections to the action valves for restoring the action valves to inactive position, a general cancel solenoid valve operatively connected to actuate the cancel valve, and electric circuit means for actuating the general cancel solenoid.

13. In a programmed control device, a spool box, a roll having a control strip thereon, means for mounting the roll on the spool box, a tracker bar on the spool box having holes in position to engage the control strip, a spool operatively mounted to rotate in the spool box and to unwind the control strip, means including a clutch for driving the spool, a clutch solenoid for engaging and disengaging the clutch, a plurality of pneumatic valves and pneumatics having control connections to holes in the tracker bar, a vacuum blower, plenum connections from the vacuum of the vacuum blower to the pneumatic valves, a double pole double throw selector switch having an A position closing one pole, an intermediate off position and a B position closing the other pole, thus providing an interlock, a first normally closed relay, a second normally closed relay, a spool hole operatively connected through the spool to respond to the control strip, a vacuum switch operatively connected to the spool hole, electric circuit means closed by the vacuum switch for energizing the first relay, electric circuit means including the selector switch closed in the A position and the second relay in normally closed position for energizing the clutch solenoid and engaging the clutch, a reroll motor operatively connected to the roll, and electric circuit means energized when another pole of the selector switch is closed in the B position for energizing and locking the second relay to interrupt the circuit through the clutch solenoid and to energize the reroll motor through a normally closed contact of the first relay, the selector switch providing interlock between the A and the B positions.

14. In a programmed control device, a spool box, a roll having a control strip thereon, means for mounting the roll in the spool box, a tracker bar on the spool box having holes in position to engage the control strip, a spool operatively mounted to rotate in the spool box and to unwind the control strip, means including a clutch for driving the spool, a clutch solenoid for engaging and disengaging the clutch, a plurality of pneumatic valves and pneumatics having control connections to holes in the tracker bar, a vacuum blower, plenum connections from the vacuum of the vacuum blower to the pneumatic valves, an interlock selector switch of double pole double throw type having an A position in which one pole is on, an intermediate off position, and a B position in which the other pole is on, a normally closed first relay, a normally closed second relay, electric circuit means through one pole of the selector switch in A position and through the second relay for energizing the clutch solenoid and through another pole of the selector switch in the B position for energizing the first relay as a step toward replay.

15. In a programmed control device, a spool box, a roll having a control strip thereon, means for mounting the roll in the spool box, a tracker bar on the spool box having holes in position to engage the control strip, a spool operatively mounted to rotate in the spool box and to unwind the control strip, means including a clutch for turning the spool, a clutch solenoid for engaging and disengaging the clutch, a plurality of pneumatic valves and pneumatics having control connections to holes in the tracker bar, a vacuum blower, plenum connections from the vacuum of the vacuum blower to the pneumatic valves, a first relay having normally closed contact means, a second relay having normally closed contact means, an interlock selector switch of double pole double throw type having one pole which closes in the A position, an intermediate off position and both poles which close in the B position, electric circuit means through the selector switch in the A position for energizing the clutch solenoid and playing the roll, electric circuit means through one pole of the selector switch in the B position and through both relays for energizing the clutch solenoid, a plurality of pneumatic action valves and pneumatics operatively connected to holes in the tracker bar and to a source of vacuum, a pneumatic cancel valve operatively connected to the source of vacuum and to the tracker bar and to the action valves for restoring the action valves to inactive position, a general cancel solenoid valve operatively connected to the cancel valve, and electric circuit means through another pole of the selector switch in the B position and through the general cancel solenoid valve for energizing the cancel valve and cancelling action by the action valves, the selector switch interlocking normal play as opposed to general cancellation.

16. In a programmed control device, a spool box, a roll having a control strip thereon, means for mounting the roll on the spool box, a tracker bar on the spool box having holes in position to engage the control strip, a spool operatively mounted to rotate in the spool box and to unwind the control strip, means including a clutch for driving the spool, clutch solenoid for engaging and disengaging the clutch, a plurality of pneumatic valves and pneumatic having control connections to holes in the tracker bar, a vacuum blower, plenum connections from the vacuum of the vacuum blower to the pneumatic valves, first relay means, a spool hole connected through the spool to respond to the presence of the control strip, a vacuum switch operatively connected to the spool hole, and electric circuit means operatively connected through the vacuum switch to the first relay to energize the clutch solenoid, the clutch solenoid being deenergized by the vacuum switch to the first relay to permit the clutch to engage.

17. A programmed control device of claim 16, further having a reroll hole on the tracker bar, a second vacuum switch operatively connected to the reroll hole, a reroll motor operatively connected to rewind the roll, a second locking relay, and electrical connections through the second vacuum switch, the second raly, the reroll motor and the clutch solenoid to energize and latch the second relay, to energize the reroll motor and to energize the clutch solenoid and disengage the clutch when the second vacuum switch closes under the control of the reroll hole on the tracker bar.

18. In a programmed control device, a pneumatic valve having a housing separated into cooperating parts for sealing purposes, a pneumatic diaphragm extending across the space within the housing and having an internal flexible diaphragm portion and a surrounding bulbous rim, the housing having in one portion, an abutting end which engages one side of the bulbous portion and the housing having in the other portion an annular recess which toward the interior of the housing has a wall sloping toward the interior of the housing and toward the opposite part of the housing so that when the two housing parts are forced together and the bulbous rim of the diaphragm is engaged between them there will be a tendency to urge the bulbous rim outwardly by the sloping wall of the housing recess.

References Cited

UNITED STATES PATENTS

| 1,118,958 | 12/1914 | Southgate | 84—15 |
| 1,185,035 | 5/1916 | Whitehead | 84—116 |
| 3,237,529 | 3/1966 | Beck et al. | 60—60 XR |
| 3,353,452 | 11/1967 | Beck et al. | 91—36 |

EDGAR W. GEOGHEGAN, Primary Examiner

U.S. Cl. X.R.

60—60; 92—96; 84—116, 122